(12) United States Patent
Steuer et al.

(10) Patent No.: US 10,938,917 B2
(45) Date of Patent: Mar. 2, 2021

(54) TRIGGERING A HIGH AVAILABILITY FEATURE IN RESPONSE TO DETECTING IMPAIRMENT OF CLIENT EXPERIENCE

(71) Applicant: ENTIT Software LLC, Sunnyvale, CA (US)

(72) Inventors: Rotem Steuer, Modin (IL); Michael Gopshtein, Yehud (IL); Eyal Kenigsberg, Dolev (IL)

(73) Assignee: MICRO FOCUS LLC, Santa Clara, CA (US)

( * ) Notice: Subject to any disclaimer, the term of this patent is extended or adjusted under 35 U.S.C. 154(b) by 1990 days.

(21) Appl. No.: 13/719,284

(22) Filed: Dec. 19, 2012

(65) Prior Publication Data
US 2014/0173095 A1    Jun. 19, 2014

(51) Int. Cl.
*H04L 29/08* (2006.01)
*G06Q 10/10* (2012.01)

(52) U.S. Cl.
CPC ........... *H04L 67/16* (2013.01); *G06Q 10/103* (2013.01)

(58) Field of Classification Search
CPC ............................. H04L 67/16; G06Q 10/103
USPC ......................................................... 709/224
See application file for complete search history.

(56) References Cited

U.S. PATENT DOCUMENTS

| | | | |
|---|---|---|---|
| 7,552,365 B1 * | 6/2009 | Marsh | G06F 11/0709 714/47 |
| 7,568,019 B1 | 7/2009 | Bhargava et al. | |
| 7,577,701 B1 * | 8/2009 | Johns et al. | 709/203 |
| 7,644,087 B2 | 1/2010 | Barkai | |
| 8,739,157 B2 * | 5/2014 | Ho et al. | 718/1 |
| 2002/0091853 A1 * | 7/2002 | Moore et al. | 709/236 |
| 2002/0099818 A1 * | 7/2002 | Russell et al. | 709/224 |
| 2002/0103663 A1 * | 8/2002 | Bankier | G06Q 20/00 709/224 |
| 2004/0210889 A1 * | 10/2004 | Childress et al. | 717/168 |
| 2005/0060535 A1 | 3/2005 | Bartas | |
| 2007/0168496 A1 * | 7/2007 | Bansod et al. | 709/224 |
| 2008/0046552 A1 * | 2/2008 | Watson et al. | 709/223 |
| 2009/0216910 A1 | 8/2009 | Duchesneau | |
| 2010/0302940 A1 * | 12/2010 | Patel et al. | 370/230 |
| 2011/0069745 A1 * | 3/2011 | Thompson et al. | 375/224 |

(Continued)

FOREIGN PATENT DOCUMENTS

CN    101729406    6/2010

OTHER PUBLICATIONS

Buzato, et al. (Jun. 2009). Dynamic content web applications: Crash, failover, and recovery analysis. In Dependable Systems & Networks, 2009. DSN'09. IEEE/IFIP International Conference on (pp. 229-238). IEEE.*

(Continued)

*Primary Examiner* — Lance Leonard Barry
*Assistant Examiner* — Timothy Sowa (57) ABSTRACT

Examples disclosed herein relate to triggering a high availability feature in response to detecting impairment of client experience. Examples include detecting, based on content of interactions between at least one application component and a client, a threshold impairment of an experience of the client in relation to the at least one application component. Examples also include triggering a high availability feature for the at least one application component in response to detecting the threshold impairment.

17 Claims, 4 Drawing Sheets

(56) References Cited

U.S. PATENT DOCUMENTS

| | | | | |
|---|---|---|---|---|
| 2011/0213753 | A1* | 9/2011 | Manmohan | 707/640 |
| 2012/0072570 | A1* | 3/2012 | Jenkins et al. | 709/224 |
| 2013/0173781 | A1* | 7/2013 | Abuelsaad et al. | 709/224 |
| 2014/0137239 | A1* | 5/2014 | Baluda et al. | 726/22 |

OTHER PUBLICATIONS

"vSphere Availability," ESXi 5.0, vCenter Server, 5.0, 2011, <http://web.archive.org/web/20110929045907/http://pubs.vmware.com/vsphere-50/topic/com.vmware.ICbase/PDF/vsphere-esxt-vcenter-server-50-availability-guide.pdf>.

Microsoft, "Monitoring Database Availability Groups," Sep. 17, 2012, <http://web.archive.org/web/20130104130039/http://technet.microsoft.com/en-us/library/dd351258(v=exchg.150).aspx>.

Service Availability Forum, "The Software Management Framework: Basic Concepts Explained," 2010, <http://www.saform.org/Page/16627-217307/ErrorNotFoundhttpwwwsaforumorg80FeaturedWhitepaper>.

VMWARE, "vSphere High Availability Deployment Best Practices," Jul. 2011, <http://web.archive.org/web/20120024071120/http://www.vmware.com/files/pdf/techpaper/vmw-vsphere-high-availability-pdf>.

Wikipedia, "High-availability cluster," Oct. 24, 2012, <http://en.wikipedia.org/w/index.php?title=High-availability_cluster&oldid=519598528>.

Wikipedia, "Service Availability Forum," Oct. 15, 2012, <http://en.wikipedia.org/w/index.php?title=Service_Availability_Forum&oldid=517835508>.

Oracle, "Information for Success: Oracle Enterprise Manager 12c," 2011, available at: <http://www.oracle.com/us/products/enterprise-manager/enterprise-manager-customer-ebook-068459.pdf>.

Oracle, "Oracle(R) Real User Experience Insight," Apr. 2011, Release Notes, 11g Release 1 for Linux x86-64, retrieved from: <http://docs.oracle.com/cd/E22345_01/doc.111/e22304.pdf>.

Vmware, Inc., "VMware vSphere Fault Tolerance (FT) for Zero Downtime," retrieved Nov. 27, 2012, retrieved from: <http://vonew.vmware.com/products/datacenter-virtualization/vsphere/fault-tolerance.html>.

Vmware, Inc., "VMware vSphere High Availability (HA)," retrieved Nov. 27, 2012, retrieved from: <http://www.vmware.com/products/datacenter-virtualization/vsphere/high-availability.html>.

Vmware, Inc., "VMware vSphere(TM) 4 Fault Tolerance: Architecture and Performance," 2009, retrieved from: <http://www.vmware.com/files/pdf/perf-vsphere-fault_tolerance.pdf>.

Vmware, Inc., "vSphere Availability Guide," 2011, retrieved from: <http://www.vmware.com/pdf/vsphere4/r41/vsp_41_availability.pdf>.

Vmware, Inc., "What's New in VMware vSphere(TM) 5.0—Availability," Jun. 2011, retrieved from: <http://www.vmware.com/files/pdf/techpaper/Whats-New-VMware-vSphere-50-Availability-Technical-Whitepaper.pdf>.

* cited by examiner

TRIGGERING A HIGH AVAILABILITY FEATURE IN RESPONSE TO DETECTING IMPAIRMENT OF CLIENT EXPERIENCE

BACKGROUND

A computing system may run an application for which the continued availability of the application to clients is a prime concern. For example, a computing system may run a web server application that implements a website through which a business sells products or services to customers. In such examples, any unavailability of the website to customers may be very undesirable. Accordingly, some computing systems may attempt to maintain application downtime at a very low level in a variety of ways.

BRIEF DESCRIPTION OF THE DRAWINGS

The following detailed description references the drawings, wherein.

DETAILED DESCRIPTION

As noted above, computing systems may attempt to maintain application downtime at a very low level in a variety of ways. In some examples, a computing system may continually monitor system components when an application is running, and may trigger a high availability feature for the application when certain performance issues are detected. As used herein, a "high availability feature" for an application is any functionality of a computing system or system infrastructure to, alone or in combination with other functionalities, implement a strategy for maintaining a desired level of at least one of availability and performance of the application. As an example, a computing system may monitor central processing unit (CPU) consumption in the system and trigger a high availability feature for an application when CPU consumption for some portion of the system running the application is unacceptably high. For example, the computing system may trigger a high availability feature when it detects 99% CPU consumption for five minutes at a server of the computing system running the application.

In other examples, the computing system may determine whether to trigger a high availability feature for an application based in part on logic of the application itself. For example, the computing system may determine whether to trigger the high availability feature in response to high CPU consumption based on whether the high CPU consumption is the result of an operation in the application that is known to be a heavy consumer of processing resources. In such examples, the application logic may prevent the system from triggering the high availability feature if the CPU consumption is the result of the known operation, and allow triggering of the high availability feature otherwise.

However, the issues monitored in the examples above do not necessarily reflect the actual experience of a user or other client interacting with the application. As such, in those examples above, the computing system may trigger a high availability feature when a client is not suffering from poor application performance or availability, and may not when a client is suffering from poor application performance or availability. Additionally, because many applications are changed over time, application logic used in determining whether to trigger a high availability feature may become irrelevant or ineffective unless it is manually adjusted as other application changes are made.

To address these issues, examples described herein may provide a monitor system to trigger a high availability feature for at least one application component in response to detecting a threshold impairment of a client experience in relation to the application component(s). In some examples described herein, the system monitor may monitor interactions between the application component(s) and a client of the application component(s), and detect, based on content of the monitored interactions, a threshold impairment in an experience of the client in relation to the application component(s). In some examples described herein, in response to detecting the threshold impairment, the monitor system may trigger a high availability feature implemented for the application component(s) by a system infrastructure running the application component(s).

In this manner, examples described herein may trigger a high availability feature for application component(s) based on the actual, monitored experience of users and other clients interacting with the application component(s). Additionally, in examples described herein, a monitor system may continue to function appropriately without changes when a monitored application is changed, since the monitor system is not dependent upon the inner logic of the application. Moreover, unlike systems relying on application logic to trigger a high availability feature, examples described herein may be used to trigger a high availability feature for an existing application without any changes to the existing application.

Figure 1:
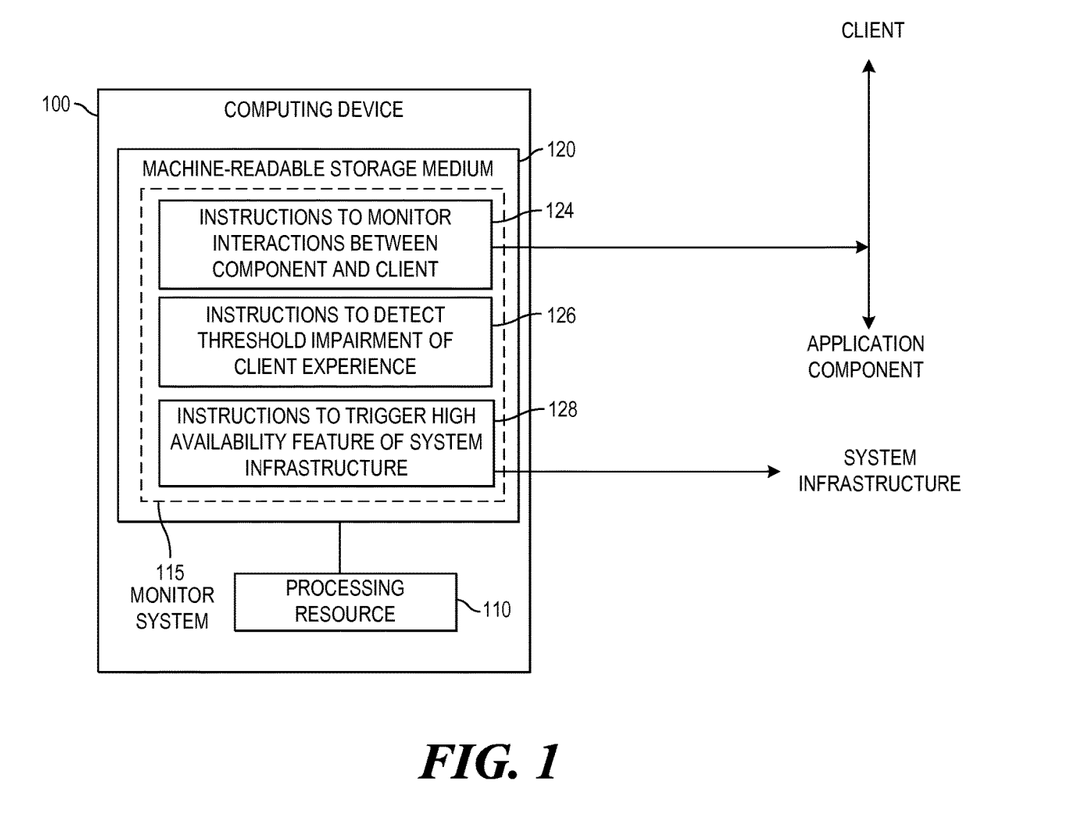
FIG. 1 is a block diagram of an example computing device to trigger a high availability feature in response to detecting a threshold impairment of a client experience.

Referring now to the drawings, FIG. 1 is a block diagram of an example computing device 100 to trigger a high availability feature in response to detecting a threshold impairment of a client experience. As used herein, a "computing device" may be a server, computer networking device, chip set, desktop computer, notebook computer, tablet computer, workstation, or any other processing device or equipment. In the example of FIG. 1, computing device 100 includes a processing resource 110 and a machine-readable storage medium 120 encoded with instructions 124, 126, and 128. In some examples, storage medium 120 may include additional instructions.

In the example of FIG. 1, instructions stored on storage medium 120, when executed by processing resource 110, may implement a monitor system 115. Such instructions implementing monitor system 115 may include instructions 124, 126, 128, and any additional instructions of storage medium 120. For example, instructions 124, 126, and 128 may be part of a larger set of instructions implementing monitor system 115. In some examples, instructions 124, 126, 128, and any other instructions described herein in relation to storage medium 120 may be stored on a machine-readable storage medium remote from but accessible to computing device 100 and processing resource 110.

In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to implement the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. Further, any machine-readable storage medium described herein may be non-transitory.

In the example of FIG. 1, instructions 124 may monitor interactions between at least one application component and a client of the at least one application component. In examples described herein, the application component(s) may be part of an application implemented locally on a computing device (e.g., a desktop, notebook, or tablet computer) utilized by a user, a web server application implementing a website accessible by a remote client system, a composite application having different application components implemented on different computing devices (e.g., implementing enterprise business processes), or any other type of application.

Any application discussed herein may include a plurality of application components. As used herein, an "application component" is any portion of an application. An application component may be, for example, any set of at least one executable instruction of the application. For example, an application component may be a set of executable instructions implementing a particular functionality of the application. Additionally, in some examples, portions of an application implemented on different computing devices may be considered different components of the application.

In examples described herein, a client of at least one application component may be any entity that makes at least one request of the application component(s). In some examples, a client may be an entity that makes a plurality of different types of requests of the application component(s). In examples described herein, a request may be in the form of a request message (e.g., an HTTP request, etc.), a command, input (e.g., from an input device of a computing device), or any other suitable type of a request for information from or action by the application component(s). For example, the client may be a computing device having a web browser to provide requests to a web server application (i.e., the application component(s)). As another example, the client and the application component(s) may be different components of the same application, such as components of different tiers of an application (e.g., front end and backend components, respectively). In other examples, the client may be a user of an application including the application component(s), where the application is implemented locally on a computing device utilized by the user. In such examples, requests from the user may be in the form of input to the application component(s) via at least one input device of the computing device.

As noted above, instructions 124 may monitor interactions between at least one application component and a client of the at least one application component. In examples described herein, interactions between a client and at least one application component may include interactions between the client and one application component of a given application, between the client and multiple application components of the given application, or between the client and any application component of the given application. Interactions between the client and any application component of an application may be referred to herein as interactions between the client and the application. Also, in examples described herein, interactions between a client and a plurality of application components of a given application may include any type of interactions between the client and the plurality of components. Such interactions may include, for example, interactions in which application component(s) providing a response to (or taking an action in response to) a client request are different than application component(s) that received the request from the client. In the example of FIG. 1, instructions 124 may monitor any such interactions between application component(s) and a client of the application component(s).

In some examples, the interactions between the application component(s) and the client may include at least one of requests provided to the application component(s) by the client, responses provided by the application component(s) to the client, actions taken by the application component(s) in response to client requests, and the like, or a combination thereof. In some examples, instructions 124 may monitor the interactions by monitoring requests provided from the client to the application component(s) and responses provided by the application component(s) to the client. In such examples, instructions 124 may monitor such requests and responses by accessing network traffic exchanged between the client and the application component(s) (e.g., via sniffing). For example, instructions 124 may access network traffic between a web server application (the application component(s)) and a computing device with a web browser (the client). In other examples, instructions 124 may access network traffic between application components implemented on different computing devices. In some examples, the network traffic may include requests from the client and responses from the application component(s) in accordance with a protocol (e.g., the hypertext transfer protocol (HTTP), etc.). In other examples, instructions 124 may monitor the interactions in any other suitable manner.

In the example of FIG. 1, instructions 126 may detect a threshold impairment in an experience of the client in relation to the at least one application component based on content of the interactions monitored by instructions 124. In examples described herein, the experience of a client in relation to at least one application component may be a measure of the performance of the at least one application component, from the perspective of the client, in response to request(s) of the client. The experience of a client may be referred to herein as a "client experience". Aspects of client experience in relation to application component(s) may include the responsiveness of the application component(s) to requests from the client (e.g., the amount of time taken to receive responses to requests), the validity or correctness of any responses of the application component(s) (e.g., as opposed to error responses), the availability of the application component(s), and the like, or a combination thereof. In examples described herein, a threshold impairment of a client experience in relation to application component(s) may be based on one or a combination of such aspects of the experience of the client.

In some examples, instructions 126 may analyze content of the interactions monitored by instructions 124 and detect the threshold impairment of the client experience based on the content. In examples described herein, content of an interaction between a client and at least one application component may include at least one of information included in a request provided by the client to the application component(s) and information included in a response provided to the client by the application component(s).

For example, instructions 126 may analyze information included in requests sent by the client to the application component(s) and information included in responses sent the client by the application component(s). Based on this analysis, instructions 126 may determine, for each request provided by the client to the application component(s), whether the application component(s) provided a response to the request within a target amount of time. The target amount of time may be any suitable amount of time (e.g., a number of seconds, minutes, or hours, etc.), and may be a configurable value. In some examples, instructions 126 may also track a number of client requests for which no response was received within the target amount of time. In such examples, instructions 126 may detect a threshold impairment of the experience of the client based on the number of requests for which no response was received within the target amount of time.

For example, while tracking the requests and responses, instructions 126 may determine that, for a threshold number of requests from the client to the application component(s), no response to the request was provided by the application component(s) to the client within the target amount of time. In such examples, instructions 126 may detect the threshold impairment in response to this determination. The threshold number of requests may be any suitable number of requests (e.g., 10, 100, etc.), and may be a configurable value. In some examples, instructions 126 may determine whether the threshold number of requests is reached within a given period defined in any suitable manner. For example, the given period may be a certain amount of time (e.g., a number of seconds, minutes, or hours), defined by the occurrence of certain event(s), or the like. The definition of the given period may be configurable.

In other examples, instructions 126 may detect the threshold impairment of the client experience based on the content of the monitored interactions in any other suitable manner. For example, instructions 126 may detect the threshold impairment in response to a determination that a threshold number of error responses have been provided by the application component(s) to the client, as described below in relation to FIG. 3. In other examples, instructions 126 may detect the threshold impairment in response to a determination that a specified functionality of a web server application is not available, based on the content of the interactions between a client and the web server application (i.e., the application component(s) in this example).

In the example of FIG. 1, instructions 128 may, in response to detection of the threshold impairment, trigger a high availability feature implemented for the at least one application component by a system infrastructure running the at least one application component. In examples described herein, the high availability feature may be any suitable high availability feature. For example, the high availability feature may cause the system infrastructure to replace the application component(s) with a backup instance of the application component(s), migrate the application component(s) to different hardware, restart (or reboot) the application component(s), or the like. In some examples, a high availability feature implemented by the system infrastructure for at least one application component may be a high availability feature implemented for a single application component (e.g., a component running on different hardware than other components of the same application), for multiple application components, or for an entire application (i.e., all application components of the application).

In examples described herein, a system infrastructure may be software (i.e., machine executable instructions) or any combination of software and hardware suitable for running the at least one application component. For example, the system infrastructure may be an operating system (OS), such as an OS for a notebook or desktop or notebook computing device, an OS utilized to provide remote computing services (e.g., a cloud operating system), or the like. In other examples, the system infrastructure may be a hypervisor, a tool suite, middleware, web server software (e.g., machine executable instructions), or the like.

In the example of FIG. 1, instructions 128 may trigger a high availability feature that may, in response to being triggered, cause the system infrastructure to replace the at least one application component with a backup instance of the at least one application component. In some examples, replacing the at least one application component with a backup instance may include replacing a single application component (e.g., a component running on different hardware than other components of the same application) with a backup instance, multiple application components with a backup instance of the application components, or an entire application (i.e., all components of the application) with a backup instance of the application. In some examples, the backup instance of the application component(s) may be a backup instance of more than the application component(s) (e.g., an entire application including the application component(s)).

As an example, the system infrastructure may run a main instance of the application component(s) on a first hardware system, and a client may interact with the application component(s) of the main instance. In such examples, the system infrastructure may also run a backup (or "shadow") instance of the application component(s) on a second hardware system, where the application component(s) of the backup instance are equivalent to and execute in parallel with the application component(s) of the main instance (with data output disabled) so that the backup instance maintains a state equivalent to that of the main instance. In such examples, the high availability feature, when triggered, may cause the system infrastructure to replace the main instance with the backup instance with data output enabled. In such examples, upon replacement, the backup instance may continue its operation from the state in which the main instance was replaced, and may take over interactions with the client.

In other examples, the backup instance may be another active instance of the application component(s). For example, the backup instance may be an instance of the application component(s) serving different clients. In such examples, the system infrastructure may replace the main instance with the backup instance by routing requests from the client to the active backup instance. For example, the main and backup instances may be instances of a web server application that serve different clients (e.g., clients located in different geographic locations). In such examples, triggering the high availability feature may cause the system infrastructure to route requests from clients of the main instance to the backup instance.

In some examples, instructions 128 may trigger a high availability feature that may, in response, cause the system infrastructure to restart the at least one application component in a state equivalent to a state of the at least one application component at the time of the triggering of the high availability feature. For example, when the high availability feature is triggered, the application component(s) may be at a particular stage in a set of operation(s), interacting with a given set of resource(s), or the like. In such examples, the system infrastructure may restart the application component(s) such that they are in the same stage of the operation(s), interacting with the same set of resource(s), or the like, as when the high availability feature was triggered. In some examples, restarting the at least one application component may include restarting a single application component (e.g., a component running on different hardware than other components of the same application), multiple application components, or an entire application (i.e., all components of the application).

By triggering a high availability feature based on real user data, such as monitored interactions between application component(s) and a client of the application component(s), examples described herein may trigger the high availability feature based on actual impairment of the experience of the client, rather than other measurements or logic that may not accurately reflect actual client experience. As such, examples described herein may improve client experience in relation to the application component(s).

In some examples, instructions 124, 126, and 128 may be part of an installation package that, when installed, may be executed by processing resource 110 to implement the functionalities described herein in relation to instructions 124, 126, and 128. In such examples, storage medium 120 may be a portable medium, such as a CD, DVD, or flash drive, or a memory maintained by a server from which the installation package can be downloaded and installed. In other examples, instructions 124, 126, and 128 may be part of an application or applications already installed on computing device 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-5.

Figure 2:
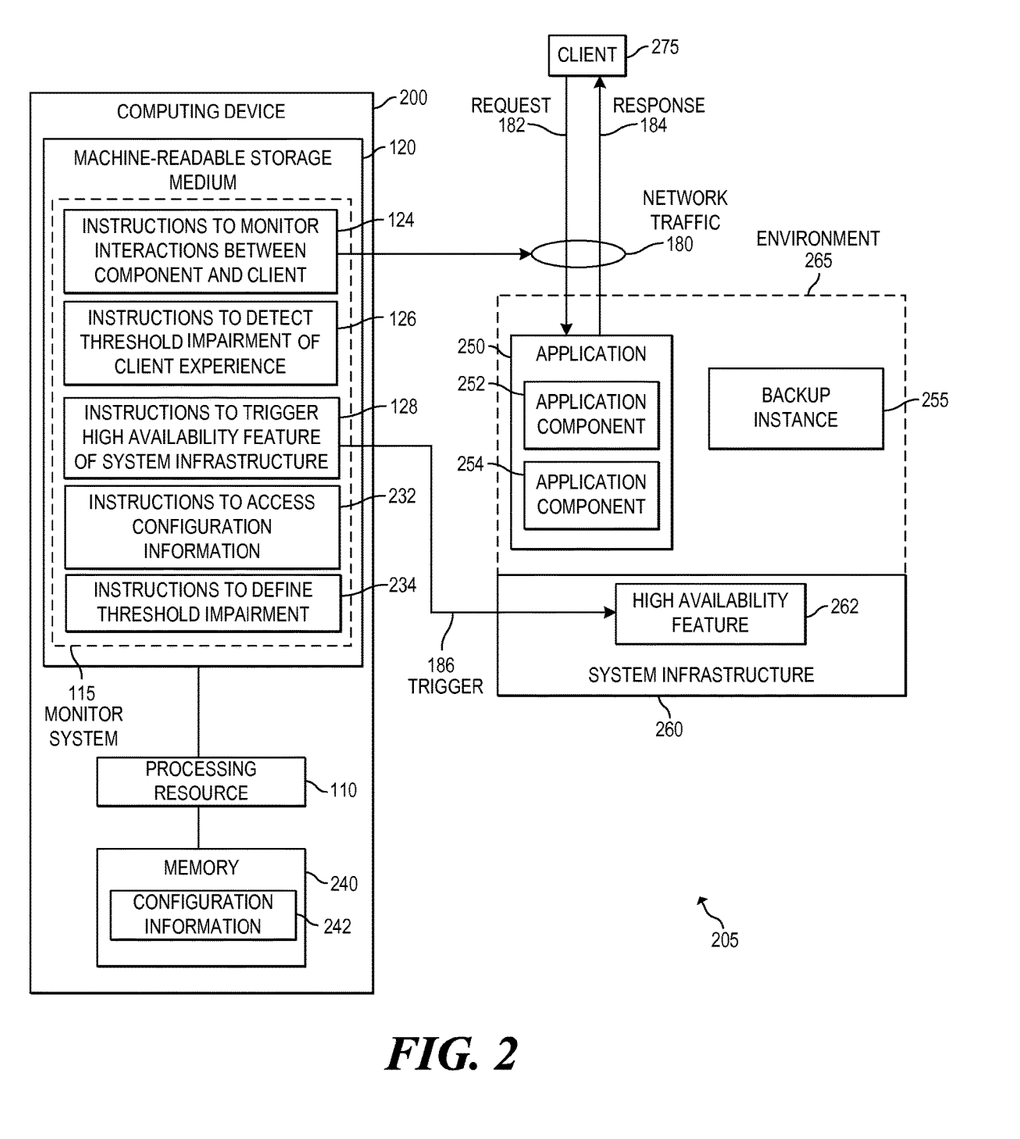
FIG. 2 is a block diagram of an example system including a computing device to define a threshold impairment of a client experience based on configuration information.

FIG. 2 is a block diagram of an example system 205 including a computing device 200 to define a threshold impairment of a client experience based on configuration information. In the example of FIG. 2, computing device 200 may include a processing resource 110, as described above in relation to FIG. 1, and a storage medium 120 including instructions 124, 126, and 128, as described above in relation to FIG. 1. In the example of FIG. 2, storage medium 120 may also include instructions 232 and 234. In some examples, storage medium 120 may include additional instructions. In the example of FIG. 2, computing device 200 also include a memory 240, which may be a computer-readable storage medium.

In the example of FIG. 2, instructions stored on storage medium 120, when executed by processing resource 110, may implement a monitor system 115, as described above in relation to FIG. 1. Such instructions implementing monitor system 115 may include instructions 124, 126, 128, 232, 234, and any additional instructions of storage medium 120. For example, instructions 124, 126, 128, 232, and 234 may be part of a larger set of instructions implementing monitor system 115. In other examples, instructions 124, 126, 128, 232, 234 and any other instructions described herein in relation to storage medium 120 may be stored on a machine-readable storage medium remote from but accessible to computing device 100 and processing resource 110.

In the example of FIG. 2, system 205 may also include a system infrastructure 260 including a high availability feature 262. System infrastructure 260 may be any system infrastructure described above in relation to FIG. 1. In some examples, system infrastructure 260 may implement an environment 265 to manage any number of hardware components and software components (i.e., machine readable instructions). In such examples, infrastructure 260 may run an application 250 including application components 252 and 254. In some examples, application 250 may include more than two application components. In the example of FIG. 2, monitor system 115 may be separate from system infrastructure 260. In such examples, monitor system 115 may be implemented outside of environment 265. In other examples, monitor system 115 may be implemented in environment 265.

High availability feature 262 may be any high availability feature described above in relation to FIG. 1. In the example of FIG. 2, high availability feature 262 may, in response to being triggered, cause system infrastructure 260 to replace at least one application component with a backup instance, as described above in relation to FIG. 1. In such examples, infrastructure 260 may run a backup instance 255 of at least one application component of application 250, as described above in relation to FIG. 1. In some examples, backup instance 255 may be a backup instance of one application component (e.g., application component 252), of multiple application components (e.g., at least application components 252 and 254), or of application 250 (e.g., all application components of application 250). In some examples, backup instance 255 may be run on a hardware system (e.g., server, etc.) of environment 265 different than the application component(s) for which it is a backup instance.

In the example of FIG. 2, instructions 124 may monitor interactions between at least one application component and a client 275 of the at least one application component, as described above in relation to FIG. 1. For example, instructions 124 may monitor the interactions by monitoring requests 182 provided from client 275 to at least one application component of application 250 and responses 184 provided by the application component(s) to client 275. In such examples, instructions 124 may monitor requests 182 and responses 184 by accessing network traffic 180 exchanged between client 275 and the application component(s) (e.g., via sniffing). In some examples, the interactions between client 275 and the at least one application component may include requests 182 and responses 184 between client 275 and one application component of application 250, between client 275 and multiple application components of application 250, or between client 275 and application 250 (i.e., any application component of application 250). For example, client 275 may be a computing device with a web browser and application 250 may be a web server application. In other examples, the monitored interactions may include requests 182 and responses 184 between client 275 and application component 252, where client 275 and application component 252 are application components of different applications implemented on different hardware, or different application components of application 250 implemented on different hardware.

As described above in relation to FIG. 1, instructions 126 may detect a threshold impairment in an experience of client 275 in relation to the at least one application component based on content of the interactions monitored by instructions 124. For example, instructions 126 may analyze content of the interactions monitored by instructions 124 and detect the threshold impairment of the client experience based on the content, as described above in relation to FIG. 1. In some examples, instructions 126 may analyze information included in requests 182 and responses 184 and detect the threshold impairment of the client experience based on this analysis, as described above in relation to FIG. 1.

In the example of FIG. 2, the threshold impairment of the client experience may be configurable. In such examples, instructions 232 may access configuration information 242, and instructions 234 may define criteria for detecting the threshold impairment based on the accessed configuration information 242. For example, instructions 232 may access configuration information 242 by actively or passively acquiring it, by reading or examining it with or without acquiring it, or in any other suitable manner. In some examples, instructions 232 may receive configuration information 242 from a user via a user interface of monitor system 115. In such examples, instructions 232 may store configuration information 242 in memory 240. In some examples, configuration information 242 may include a configuration (e.g., a value, setting, etc.) for any aspect of monitor system 115 described herein as being configurable. For example, configuration information 242 may include values, settings, definitions, identifications, etc., for any time periods, thresholds, actions, sequences, or the like, described herein as being configurable.

In the example of FIG. 2, instructions 234 may define the criteria for detecting the threshold impairment of the experience of a client based on information included in configuration information 242. In such examples, instructions 234 may define the criteria used by instructions 126 to detect the threshold impairment based on accessed configuration information 242. For example, as described above, instructions 126 may detect the threshold impairment in response to determining that, for a threshold number of requests from the client to the application component(s), no response to the request was provided by the application component(s) to the client within the target amount of time. In such examples, configuration information 242 may specify at least one of the threshold number of requests, the target amount of time, and the like. In other examples, configuration information 242 may specify a threshold number of error responses, or specify the criteria for detecting the threshold impairment based on the unavailability of a functionality of an application.

In the example of FIG. 2, instructions 128 may, in response to detection of the threshold impairment, trigger high availability feature 262 implemented for the at least one application component of application 250 by system infrastructure 260 running the at least one application component. In some examples, instructions 128 may provide a triggering message 186 to system infrastructure 260 to trigger high availability feature 262. In such examples, instructions 128 may provide the triggering message 186 in accordance with an Application Programming Interface (API) of system infrastructure 260 (e.g., using a routine, call, data structure, etc., defined by the API). For example, high availability feature 262 may cause system infrastructure 260 to replace the application component(s) with backup instance 255, as described above in relation to FIG. 1. In some examples, the backup instance 255 may be a backup instance of an application or a set of application component(s) including the application component(s) with which client 275 interacts.

In some examples, instructions 124, 126, 128, 232, 234 and any other instructions of storage medium 120 may be part of an installation package that, when installed, may be executed by processing resource 110 to implement the functionalities described herein in relation to instructions 124, 126, 128, 232, and 234. In such examples, storage medium 120 may be a portable medium, such as a CD, DVD, or flash drive, or a memory maintained by a server from which the installation package can be downloaded and installed. In other examples, instructions 124, 126, 128, 232, and 234 may be part of an application or applications already installed on computing device 100 including processing resource 110. In such examples, the storage medium 120 may include memory such as a hard drive, solid state drive, or the like. In some examples, functionalities described herein in relation to FIG. 2 may be provided in combination with functionalities described herein in relation to any of FIGS. 1 and 3-5.

Figure 3:
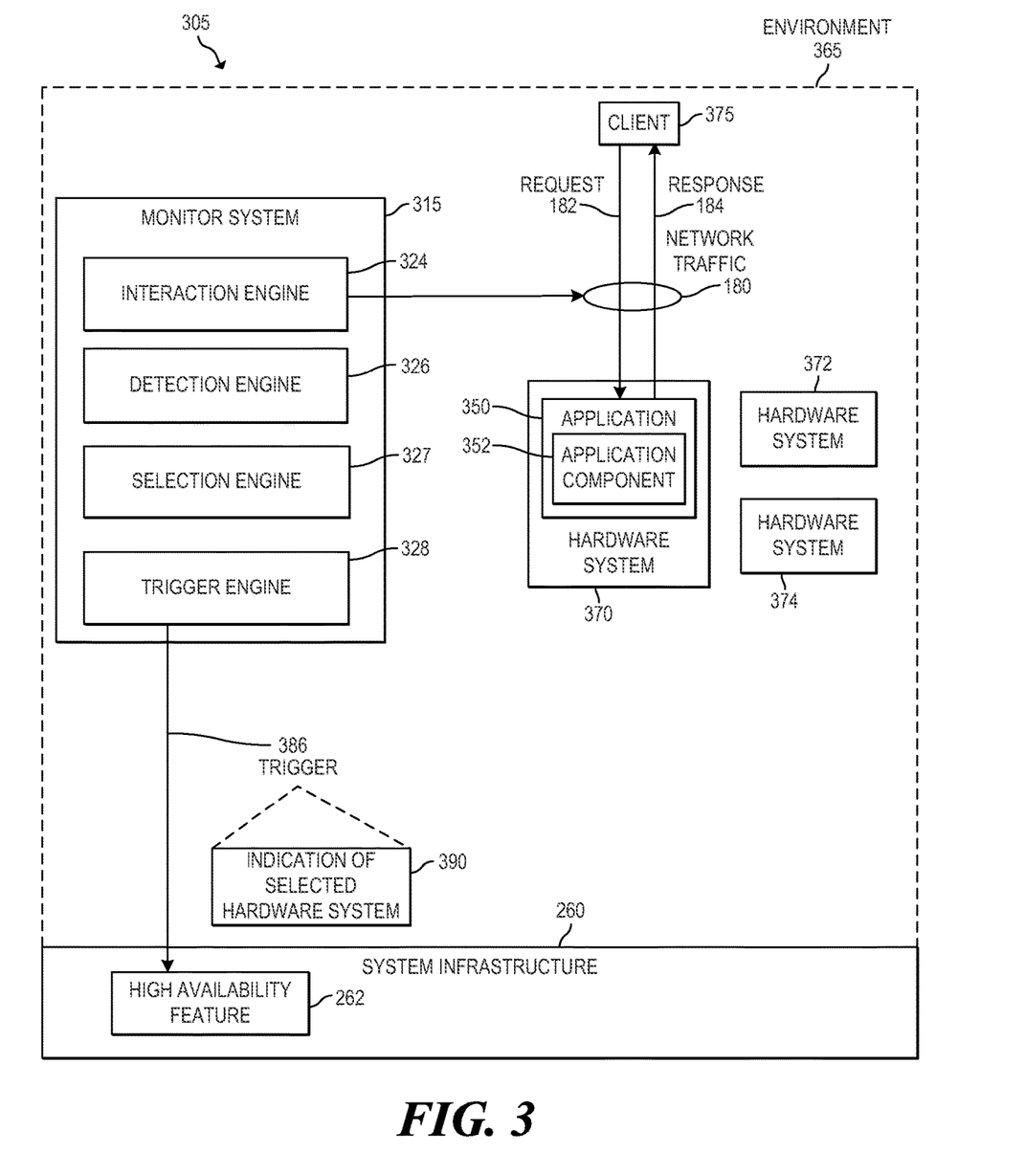
FIG. 3 is a block diagram of an example system including a monitor system to detect a threshold impairment of a client experience based on interactions between at least one application component and a client.

FIG. 3 is a block diagram of an example system 305 including a monitor system 315 to detect a threshold impairment of a client experience based on interactions between at least one application component and a client. In the example of FIG. 3, system 305 includes a system infrastructure 260 including a high availability feature 262. In the example of FIG. 3, system infrastructure 260 may be any system infrastructure described above in relation to FIG. 1, and high availability feature 262 may be any high availability feature described above in relation to FIG. 1.

System infrastructure 260 may implement an environment 365 to manage any number of hardware components and software components (i.e., machine readable instructions). In the example of FIG. 3, environment 365 may include hardware systems 370, 372, and 374, each of which may be a computing device (e.g., a server). In the example of FIG. 3, system infrastructure 260 may run an application 350, including at least an application component 352, on hardware system 370. In some examples, application 350 may include any number of application components.

In some examples, client 375 may be included in environment 365 of system infrastructure 260. In other examples, client 375 may be separate from environment 365. Additionally, in some examples, monitor system 315 may be implemented within system infrastructure 260 as part of environment 365. In other examples, monitor system 315 may be separate from system infrastructure 260 and environment 365. Additionally, in some examples, monitor system 315 may be separate from client 375 and application 350. In other examples, monitor system 315 may be integrated with application 350.

In the example of FIG. 3, monitor system 315 includes engines 324, 326, 327, and 328. In some examples, monitor system 315 may include additional engines. Each of engines 324, 326, 327, and 328, and any other engines of monitor system 315, may be any combination of hardware and programming to implement the functionalities of the respective engine. Such combinations of hardware and programming may be implemented in a number of different ways. For example, the programming may be processor executable instructions stored on a non-transitory machine-readable storage medium and the hardware may include a processing resource to execute those instructions. In such examples, the machine-readable storage medium may store instructions that, when executed by the processing resource, implement monitor system 315. The machine-readable storage medium storing the instructions may be integrated in the same computing device as the processing resource to execute the instructions, or the machine-readable storage medium may be separate but accessible to the computing device and the processing resource. The processing resource may one processor or multiple processors included in a single computing device or distributed across multiple computing devices.

In some examples, the instructions can be part of an installation package that, when installed, can be executed by the processing resource to implement monitor system 315. In such examples, the machine-readable storage medium may be a portable medium, such as a CD, DVD, or flash drive, or a memory maintained by a server from which the installation package can be downloaded and installed. In other examples, the instructions may be part of an application or applications already installed on a computing device including the processing resource. In such examples, the machine-readable storage medium may include memory such as a hard drive, solid state drive, or the like.

In the example of FIG. 3, interaction engine 324 may monitor interactions between at least one application component running on a hardware system 370 and a client 375 of the at least one application component, as described above in relation to instructions 124 of FIG. 1. For example, engine 324 may monitor the interactions by monitoring requests 182 provided from client 375 to at least one application component of application 350 and responses 184 provided by the application component(s) to client 375. In such examples, engine 324 may monitor requests 182 and responses 184 by accessing network traffic 180 exchanged between client 375 and the application component(s) (e.g., via sniffing). In such examples, engine 324 may monitor interactions between client 375 and the application component(s) based on the accessed network traffic 180. In some examples, the interactions between client 375 and the at least one application component may include requests 182 and responses 184 between client 375 and one application component of application 350, between client 375 and multiple application components of application 350, or between client 375 and application 350 (i.e., any application component of application 350). In some examples, client 375 may be a computing device with a web browser and application 350 may be a web server application.

In other examples, the monitored interactions may include requests 182 and responses 184 between client 375 and application component 352, where client 375 and application component 352 are application components of different applications implemented on different hardware systems, or different application components of the same application (e.g., application 350) implemented on different hardware systems. For example, client 375 may be a first backend component of application 350 (e.g., an application component implementing a web server) and application component 352 may be a second backend component of application 350 (e.g., an application component implementing a database) that receives requests 182 from the first backend component.

Detection engine 326 may detect a threshold impairment in an experience of client 375 in relation to the at least one application component of application 350, based on content of the monitored interactions, as described above in relation to instructions 126 of FIG. 1. For example, engine 326 may analyze content of the interactions monitored by engine 324 and detect the threshold impairment of the client experience based on the content, as described above in relation to FIG. 1. In some examples, engine 326 may analyze information included in requests 182 and responses 184 and detect the threshold impairment of the client experience based on this analysis.

In some examples, engine 326 may detect the threshold impairment in response to determining that, for a threshold number of requests from client 375 to the application component(s), no response to the request was provided by the application component(s) to client 375 within the target amount of time, as described above in relation to FIG. 1. In other examples, engine 326 may detect the threshold impairment based on a number of requests from client 375 to the application component(s) for which no response was provided by the application component(s) within a target amount of time and a number of clients interacting with the application component(s). For example, engine 326 may detect the threshold impairment if the number of requests without a timely response is high relative to the number of clients interacting with the application component(s). In such examples, a ratio of requests to clients indicating the threshold impairment may be configurable.

In other examples, detection engine 326 may determine that a threshold number of error responses 184 have been provided by the at least one application component to client 372, and may detect the threshold impairment in response to this determination. In such examples, engine 326 may analyze the content of responses 184 to determine whether the responses are error responses (e.g., including an error indication, error code, or the like). In some examples, engine 326 may determine whether the threshold number of error responses is reached within a given period defined in any suitable manner. For example, the given period may be a certain amount of time (e.g., a number of seconds, minutes, or hours), or defined by the occurrence of certain event(s). The definition of the given period may be configurable.

In the example of FIG. 3, in response to detection of the threshold impairment, selection engine 327 may select, from a plurality of hardware systems, a hardware system having a lesser load than hardware system 370 on which the at least one application component is running. For example, the plurality of hardware systems may include hardware systems 372, 374, and any other hardware systems of environment 375, any of which may be remote from one another and communicate via one or more computer networks (e.g., the Internet). In examples described herein, selection engine 327 may determine the load of a hardware system in any suitable manner. For example, engine 327 may determine the respective loads of hardware systems 370, 372, 374, and any other hardware systems of environment 365 based on the rate at which each of the hardware systems receive requests (e.g., the number of requests received per second).

In one example, at the time of the detection of the threshold impairment, hardware system 372 may have a lesser load than hardware system 370, while hardware system 374 may have a greater load than hardware system 370. In such examples, in response to the detection of the threshold impairment, engine 327 may select hardware system 372, from a plurality of hardware systems including hardware systems 372 and 374. In some examples, engine 327 may select a hardware system to which high availability feature 262 is to migrate the application component(s). By selecting a hardware system with a lesser load than the current hardware system, examples described herein may improve client experience by the migration, which may not occur if the application component(s) were migrated to a hardware system with the same or a greater load than the current hardware system.

In some examples, trigger engine 328 may, in response to detection of the threshold impairment, trigger high availability feature 262 implemented for the at least one application component of application 350 by system infrastructure 260 running the at least one application component. In the example of FIG. 3, high availability feature 262 may migrate the at least one application component to the hardware system selected by engine 327 in response to the detection of the threshold impairment.

In some examples, engine 328 may provide a triggering message 386 to system infrastructure 260 to trigger high availability feature 262 to thereby cause the migration. In such examples, engine 328 may provide the triggering message 386 in accordance with an API of system infrastructure 260. In some examples, message 386 may include an indication 390 of the hardware system selected by engine 327. In such examples, high availability feature 262 may migrate the application component(s) to the hardware system indicated in message 386. In examples described herein, migration of at least one application component to another hardware system may include moving the execution of the application component(s) from one hardware system to another hardware system such that the execution of the application component(s) resume execution on the other hardware system in a state equivalent to the state of the application component(s) at the time of the detection of the threshold impairment in the experience of the client. In some examples, functionalities described herein in relation to FIG. 3 may be provided in combination with functionalities described herein in relation to any of FIGS. 1-2 and 4-5.

Figure 4:
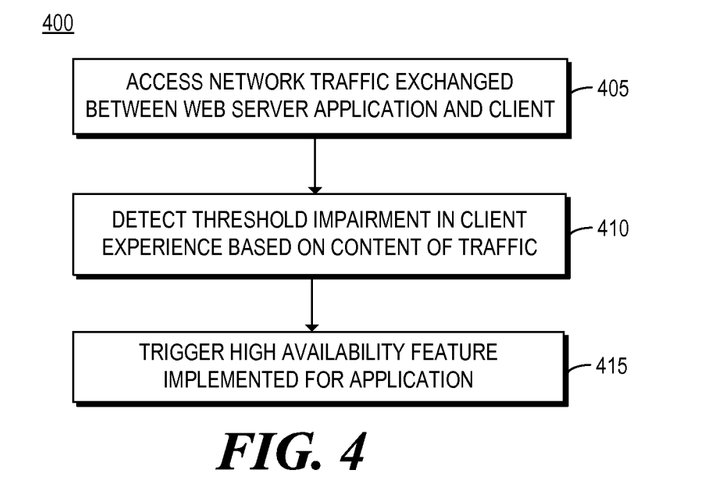
FIG. 4 is a flowchart of an example method for triggering a high availability feature for a web server application.

FIG. 4 is a flowchart of an example method 400 for triggering a high availability feature for a web server application. Although execution of method 400 is described below with reference to monitor system 315 of FIG. 3, other suitable systems for execution of method 400 can be utilized (e.g., monitor system 115 of FIG. 1 or FIG. 2). Additionally, implementation of method 400 is not limited to such examples.

At 405 of method 400, engine 324 of monitor system 315 may access network traffic 180 exchanged between a web server application 350 and a client 375 of web server application 350. In such examples, monitor system 315 may be separate from client 375 and web server application 350. In some examples, client 375 may be separate from system infrastructure 260 (e.g., implemented outside of environment 365).

At 410, engine 326 may detect a threshold impairment of an experience of client 375 in relation to web server application 350 based on content of accessed network traffic 180 in any manner described above. At 415, in response to detecting the threshold impairment, engine 328 may trigger a high availability feature 262 implemented for web server application 350 by the system infrastructure 260 running web server application 350. In such examples, high availability feature 262 may be any high availability feature described above in relation to FIG. 1.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3 and 5.

Figure 5:
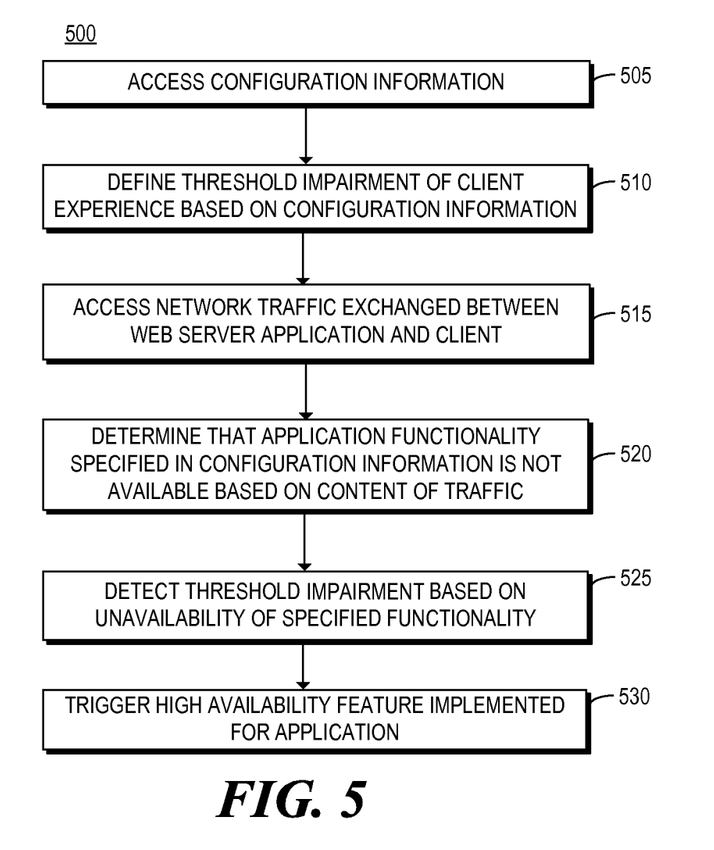
FIG. 5 is a flowchart of an example method for defining a threshold impairment of a client experience based on configuration information.

FIG. 5 is a flowchart of an example method 500 for defining a threshold impairment of a client experience based on configuration information. Although execution of method 500 is described below with reference to monitor system 315 of FIG. 3, other suitable systems for execution of method 500 can be utilized (e.g., monitor system 115 of FIG. 1 or FIG. 2). Additionally, implementation of method 500 is not limited to such examples.

At 505 of method 500, detection engine 326 may access configuration information, as described above in relation to FIG. 2. For example, engine 326 may receive the configuration information from a user via a user interface of monitor system 315. At 510, engine 326 may define the criteria for detecting a threshold impairment of an experience of a client 375, based on the accessed configuration information, as described above in relation to FIG. 2.

In some examples, the configuration information may specify a functionality of the web server application whose unavailability, determined from interactions between the client and the web server application, may indicate a threshold impairment in the experience of the client alone or in combination with other information. For example, the functionality may be a component of the web server application implementing a portion of a webpage to receive payment information for goods, services, or the like. In some examples, engine 326 may detect the threshold impairment based at least in part on the unavailability of this functionality to the client. In some examples, engine 326 may detect the threshold impairment based on this unavailability if the same functionality has been determined to be unavailable for a threshold number of times, for a threshold number of clients, or the like, or a combination thereof.

In other examples, the functionality may be defined in the configuration information as a sequence of actions. In such examples, the functionality may be determined to be unavailable if the sequence is not successfully completed when attempted. For example, the sequence may include navigating to a webpage, selecting item(s) for purchase, and entering payment information to pay for the selected item(s). In such examples, engine 326 may detect the threshold impairment based at least in part on the sequence not being completed successfully when attempted. In some examples, engine 326 may detect the threshold impairment based on the failure of the specified sequence if the sequence has been determined to be unsuccessful a threshold number of times, for a threshold number of clients, or the like, or a combination thereof.

At 515, engine 324 of monitor system 315 may access network traffic 180 exchanged between a web server application 350 and a client 375 of web server application 350. In such examples, monitor system 315 may be separate from client 375 and web server application 350. Also, in such examples, client 375 may be separate from environment 365 of system infrastructure 260. At 520, engine 326 may determine, based on the content of the accessed network traffic 180, that a functionality of web server application 350 specified in the configuration information is not available to client 375. For example, engine 326 may determine, based on the content of traffic 180, whether a specified sequence of actions is not available to client 375 (e.g., if the sequence fails).

At 525, engine 326 may detect the threshold impairment based on the determination that the specified functionality is not available to the client. For example, engine 326 may detect the threshold impairment based a determination that the functionality is unavailable if the functionality has been determined to be unavailable a threshold number of times, for a threshold number of clients, or the like, or a combination thereof. At 530, in response to detecting the threshold impairment, engine 328 may trigger a high availability feature 262 implemented for web server application 350 by the system infrastructure 260 running web server application 350. In such examples, high availability feature 262 may be any high availability feature described above in relation to FIG. 1.

Although the flowchart of FIG. 5 shows a specific order of performance of certain functionalities, method 500 is not limited to that order. For example, the functionalities shown in succession in the flowchart may be performed in a different order, may be executed concurrently or with partial concurrence, or a combination thereof. In some examples, functionalities described herein in relation to FIG. 5 may be provided in combination with functionalities described herein in relation to any of FIGS. 1-4.

What is claimed is:

1. A non-transitory machine-readable storage medium encoded with instructions that are executable by a computing device to:
    monitor interactions between at least one application component and clients that interact over a network with the at least one application component, the at least one application component running on a system, the system and the clients separate from the computing device;
    detect, based on content of the monitored interactions, a threshold impairment in experiences of the clients in relation to the at least one application component,
    wherein the instructions to detect the threshold impairment in the experience of the clients comprise instructions to detect that a sequence of actions to perform a task on a website was not successfully completed a plurality number of times greater than a first threshold by a plurality number of the clients greater than a second threshold; and
    in response to the detection of the threshold impairment, trigger a high availability feature implemented for the at least one application component by a system infrastructure running the at least one application component.

2. The storage medium of claim 1, further comprising instructions to:
    access configuration information; and
    define criteria for detecting the threshold impairment based on the accessed configuration information.

3. The storage medium of claim 1, wherein the instructions to detect comprise instructions to analyze the content of the monitored interactions.

4. The storage medium of claim 1, wherein the instructions to detect comprise instructions to:
    determine that, for a threshold number of requests from the clients to the at least one application component, no response to the requests was provided by the at least one application component to the clients within a target amount of time; and
    detect the threshold impairment in response to the determination.

5. The storage medium of claim 1, wherein, in response to being triggered, the high availability feature is to cause the system infrastructure to replace the at least one application component with a backup instance of the at least one application component.

6. The storage medium of claim 1, wherein the instructions to monitor comprise instructions to:
    monitor interactions between the clients and any component of an application including the at least one application component;
    wherein the monitored interactions include the interactions between the clients and any component of the application,
    wherein the high availability feature comprises a high availability feature implemented for multiple components of the application by the system infrastructure.

7. The storage medium of claim 6, wherein, in response to being triggered, the high availability feature is to cause the system infrastructure to restart the application in a state equivalent to a state of the application at the time of the triggering of the high availability feature.

8. The storage medium of claim 6, wherein:
    in response to being triggered, the high availability feature is to cause the system infrastructure to replace the application with a backup instance of the application.

9. The storage medium of claim 1, wherein the sequence of actions comprises navigating to a webpage and making selections in the webpage.

10. A monitor system comprising:
    an interaction engine to monitor interactions between at least one application component running on a first hardware system and clients that interact over a network with the at least one application component, each of the clients and the first hardware system separate from each other and from the monitor system;
    a detection engine to detect, based on content of the monitored interactions, a threshold impairment in experiences of the clients in relation to the at least one application component, wherein to detect the threshold impairment in the experience of the clients, the detection engine is to detect that a sequence of actions to perform a task on a website was not successfully completed a plurality number of times greater than a first threshold by a plurality number of the clients greater than a second threshold;
    a selection engine to select, from a plurality of second hardware systems, a second hardware system having a lesser load than the first hardware system in response to detection of the threshold impairment; and
    a trigger engine to, in response to detection of the threshold impairment, trigger a high availability feature to migrate the at least one application component to the selected second hardware system, wherein the high availability feature is implemented by a system infrastructure running the at least one application component.

11. The monitor system of claim 10, wherein the detection engine is to detect the threshold impairment in response to a determination that a threshold number of error responses have been provided by the at least one application component to the clients.

12. The monitor system of claim 10, wherein:
    the detection engine is to detect the threshold impairment based on a number of requests from the clients to the at least one application component for which no response was provided by the at least one application component within a target amount of time, and a number of clients interacting with the at least one application component.

13. The monitor system of claim 10, wherein:
    the interaction engine is to access network traffic exchanged over the network between the at least one application component and the clients, wherein the interaction engine is to monitor the interactions based on the accessed network traffic.

14. The monitor system of claim 10, wherein the sequence of actions comprises navigating to a webpage and making selections in the webpage.

15. A method comprising:

accessing, with a monitor system comprising a processor, network traffic exchanged over a network between a web server application and clients of the web server application, wherein the monitor system is separate from the clients and a server system running the web server application, and the clients are separate from the server system;

detecting, by the monitor system based on content of the accessed network traffic, a threshold impairment of an experience of the clients in relation to the web server application, wherein detecting the threshold impairment in the experience of the clients comprise detecting that a sequence of actions to perform a task on a website was not successfully completed a plurality number of times greater than a first threshold by a plurality number of the clients greater than a second threshold; and in response to detecting the threshold impairment, triggering a high availability feature implemented for the web server application by a system infrastructure running the web server application.

16. The method of claim 15, further comprising:

accessing configuration information; and defining criteria for detecting the threshold impairment based on the accessed configuration information.

17. The method of claim 16, wherein the detecting comprises:

determining, based on the content of the accessed network traffic, that a functionality of the web server application specified in the configuration information is not available to the clients; and detecting the threshold impairment based on the determination that the specified functionality is not available to the clients.

* * * * *